United States Patent
Ochiai et al.

(10) Patent No.: US 6,314,568 B1
(45) Date of Patent: Nov. 6, 2001

(54) BROADCAST-PROGRAM VIEWING METHOD AND SYSTEM TO ALLOW CUSTOMIZED VIEWING BASED ON USER INPUT

(75) Inventors: Katsuhiro Ochiai; Hiroshi Matoba, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/226,763

(22) Filed: Jan. 6, 1999

(30) Foreign Application Priority Data

Jan. 8, 1998 (JP) .................................................. 10-013161

(51) Int. Cl.[7] .................................................. H04N 7/10
(52) U.S. Cl. .................................. 725/34; 725/38; 725/61
(58) Field of Search ...................... 348/1, 7, 10; 455/4.2; 345/327, 328; 709/219; 725/9, 25, 32, 35, 34, 37, 51, 59, 100, 38, 109, 46, 61

(56) References Cited

U.S. PATENT DOCUMENTS

| | | | |
|---|---|---|---|
| 4,750,213 | * | 6/1988 | Novak .................................... 455/67 |
| 5,410,344 | * | 4/1995 | Graves et al. ............................ 348/1 |
| 5,589,945 | * | 12/1996 | Abecassis ................................ 386/83 |
| 6,002,394 | * | 12/1999 | Schein et al. .......................... 345/327 |
| 6,025,868 | * | 2/2000 | Russo ........................................ 348/3 |
| 6,160,570 | * | 12/2000 | Sitnik ........................................ 348/1 |

FOREIGN PATENT DOCUMENTS

| | | |
|---|---|---|
| 2-310877 | 12/1990 | (JP) . |
| 3-80782 | 4/1991 | (JP) . |
| 8-235840 | 9/1996 | (JP) . |
| 9-70011 | 3/1997 | (JP) . |
| 9-182019 | 7/1997 | (JP) . |
| 9-200687 | 7/1997 | (JP) . |
| 9-312811 | 12/1997 | (JP) . |

OTHER PUBLICATIONS

Japanese Office Action issued Jan. 28, 2000 a related application and English translation of revelant portions.

* cited by examiner

Primary Examiner—Victor R. Kostak
(74) Attorney, Agent, or Firm—Ostrolenk, Faber, Gerb & Soffen, LLP

(57) ABSTRACT

A broadcast-program viewing method is provided, which is capable of optionally viewing broadcast programs transmitted by a broadcasting station according to a viewer's taste or desire. In the step (a), original broadcast programs transmitted by a broadcasting station are received and stored onto an information storage medium capable of random access. Each of the received original broadcast programs contains items having attribute information. In the step (b), the attribute information for the items of the received original broadcast programs is acquired and stored onto the information storage medium. In the step (c), viewer's information is specified according to a viewer's taste or desire. In the step (d), the attribute information for the items of the received original broadcast programs and the specified viewer's information are compared to designate at least one desired item in the items of the received original broadcast programs having a desired relationship with the inputted viewer's information. In the step (e), the at least one desired item in the items of the received original broadcast programs are reproduced according to the specified viewer's information as a viewer's program.

20 Claims, 11 Drawing Sheets

ORIGINAL PROGRAM PR

VIEWER'S PROGRAM PR'

FIG. 9

| ITEMS | COMPARISON RESULT | REPRODUCING TIME |
|---|---|---|
| ITEM A | A-INF(1) = V-INF | $t_0' - t_1'$ |
| ITEM B | A-INF(2) = V-INF | $t_1' - t_2'$ |
| ITEM C | A-INF(3) ≠ V-INF | — |
| ITEM D | A-INF(4) = V-INF | $t_2' - t_3'$ |
| ITEM E | A-INF(5) ≠ V-INF | — |
| ITEM F | A-INF(6) = V-INF | $t_3' - t_4'$ |

FIG. 10

| ITEMS | COMPARISON RESULT | REPRODUCING TIME |
|---|---|---|
| ITEM A | A-INF(1) = V-INF | $t_0'$ — $t_1'$ |
| ITEM B | A-INF(2) = V-INF | $t_3'$ — $t_4'$ |
| ITEM C | A-INF(3) = V-INF | $t_5'$ — $t_6'$ |
| ITEM D | A-INF(4) = V-INF | $t_2'$ — $t_3'$ |
| ITEM E | A-INF(5) = V-INF | $t_1'$ — $t_2'$ |
| ITEM F | A-INF(6) = V-INF | $t_4'$ — $t_5'$ |

FIG. 11

| ITEMS | COMPARISON RESULT | REPRODUCING TIME |
|---|---|---|
| ITEM A | A-INF(1) = V-INF | $t_0' - t_1'$ |
| ITEM B | A-INF(2) ≠ V-INF | — |
| ITEM C | A-INF(3) = V-INF | $t_2' - t_3'$ |
| ITEM D | A-INF(4) ≠ V-INF | — |
| ITEM E | A-INF(5) ≠ V-INF | — |
| ITEM F | A-INF(6) = V-INF | $t_5' - t_6'$ |
| ITEM G | A-INF(7) = V-INF | $t_4' - t_5'$ |
| ITEM H | A-INF(8) = V-INF | $t_1' - t_2'$ |
| ITEM I | A-INF(9) = V-INF | $t_3' - t_4'$ |
| ITEM J | A-INF(10) ≠ V-INF | — |

BROADCAST-PROGRAM VIEWING METHOD AND SYSTEM TO ALLOW CUSTOMIZED VIEWING BASED ON USER INPUT

BACKGROUND OF THE INVENTION

1. Field of the Invention

The present invention relates to a broadcast-program viewing method and system and more particularly, to a viewing method and a viewing system of broadcast programs such as television (TV) programs capable of viewing the programs from a different angle from those transmitted by a broadcast station or stations according to a viewer's or subscriber's taste.

2. Description of the Prior Art

FIG. 1 schematically shows a receiving method of TV programs transmitted from various broadcasting stations.

As seen from FIG. 1, a broadcasting station 101 transmits a radio wave conveying a lot of TV programs to the sky. The radio wave thus transmitted travels through the sky and then, is received by a receiving antenna 102 mounted by a viewer or subscriber. The radio wave thus received is sent to a broadcast receiving terminal, i.e., a TV set 103, provided by the viewer. The TV set 103 extracts the transmitted picture and sound information from the received radio wave and reproduces them at a screen and speakers of the TV set 103. Through these processes, the viewer becomes able to view the desired TV programs transmitted from the broadcasting station 101 as necessary.

The transmitted TV programs may be recorded onto a video tape by the use of a video tape recorder (VTR). In this case, the viewer is able to view the recorded programs at any time he wants.

Although the above explanation describes the TV programs, the same explanation may be applied to sound broadcasting (i.e., radio) programs. In this case, a listener listens directly the transmitted programs at a radio receiver, or listens indirectly the recorded programs onto a cassette tape by the use of a tape recorder.

Typically, the contents of the TV programs have been fixed prior to the transmission from the broadcasting station 101, and it has been difficult for the viewers or subscribers to apply any revision and/or modification to the TV programs after the program editing has been completed. Therefore, it has been usual that the viewers view the TV programs without any change as transmitted from the broadcasting station 101.

FIG. 2A schematically shows the configuration of a TV program PR transmitted from the broadcasting station 101. This program PR may be termed an "original TV program". FIG. 2B schematically shows the configuration of a TV program PR' viewed by the viewer. This program PR' may be termed a "viewer's TV program".

As seen from FIG. 2A, the original TV program PR contains items A, B, C, D, and E and F sequentially arranged with time. Also, as seen from FIG. 2B, the viewer's TV program PR' contains the same items A, B, C, D, E and F as that of the original TV program PR, and the timing order or arrangement of these items A, B, C, D, and E and F is the same as that of the original TV program PR.

Conventionally, to change the order of sequentially-transmitted original TV programs and/or to select and combine desired ones of the original TV programs or their desired items, the viewer needs to store the programs onto a video tape or tapes by using his VTR. Then, he needs to reedit the stored original TV programs as desired by fast-forwarding and/or rewinding the video tape or tapes and/or by selectively dubbing the necessary items of the programs from one of the stored tapes to another. Thus, it is essential for the viewer to carry out complicated and/or troublesome operations for this purpose.

SUMMARY OF THE INVENTION

Accordingly, an object of the present invention is to provide a broadcast-program viewing method and a broadcast-program viewing system that make it possible to view broadcast programs transmitted by a broadcasting station or stations from a different angle.

Another object of the present invention is to provide a broadcast-program viewing method and a broadcast-program viewing system capable of optionally viewing broadcast programs transmitted by a broadcasting station or stations according to a viewer's taste or desire.

The above objects together with others not specifically mentioned will become clear to those skilled in the art from the following description.

According to a first aspect of the present invention, a broadcast-program viewing method is provided, which is comprised of the following steps (a) to (e).

(a) Original broadcast programs transmitted by a broadcasting station are received and stored onto an information storage medium capable of random access. Each of the received original broadcast programs contains items having attribute information.

(b) The attribute information for the items of the received original broadcast programs is acquired and stored onto the information storage medium.

(c) Viewer's information is specified according to a viewer's taste or desire.

(d) The attribute information for the items of the received original broadcast programs and the specified viewer's information are compared to designate at least one desired item in the items of the received original broadcast programs having a desired relationship with the specified viewer's information.

(e) The at least one desired item designated in the items of the received original broadcast programs is reproduced according to the specified viewer's information as a viewer's program.

With the broadcast-program viewing method according to the first aspect of the present invention, each of the received original broadcast programs contains the items having the attribute information, and the attribute information for the items is acquired and stored onto the information storage medium.

Then, the attribute information for the items of the received original broadcast programs is compared with the specified viewer's information, thereby designating at least one desired item in the items of the received original broadcast programs having the desired relationship with the specified viewer's information. Subsequently, the at least one desired item designated in the items of the received original broadcast programs is reproduced according to the specified viewer's information as the viewer's program.

As a result, the viewer is able to view the original broadcast programs transmitted by the broadcasting station from a different angle. In other words, because the viewer's program is readily varied by changing the viewer's information, the viewer is able to optionally view the original broadcast programs transmitted by the broadcasting station according to his taste or desire.

In a preferred embodiment of the method according to the first aspect of the present invention, the items of the received original broadcast programs are selected and/or rearranged along a time axis according to the specified viewer's information in the step (e).

In still another preferred embodiment of the method according to the first aspect of the present invention, the attribute information for the items of the received original broadcast programs is acquired through a different path from a broadcasting wave conveying the original broadcast programs.

In this case, the attribute information may be acquired through a communication line such as the INTERNET using a communication receiver such as a modem.

In a further preferred embodiment of the method according to the first aspect of the present invention, the attribute information for the items of the received original broadcast programs is acquired through a broadcasting wave conveying the original broadcast programs.

In this case, the attribute information is preferably transmitted from the broadcasting station transmitting the original programs and then, received along with the original broadcast programs. However, the attribute information may be transmitted from a different broadcasting station from the broadcasting station transmitting the original programs.

In a still further preferred embodiment of the method according to the first aspect of the present invention, the viewer's program is (i) a digest of at least one of the broadcast programs transmitted by the broadcasting station, (ii) a program obtained by reediting at least two ones of the broadcast programs transmitted by the broadcasting station, or (iii) a program obtained by rearranging the items of the broadcast programs transmitted by the broadcasting station along a time axis.

According to a second aspect of the present invention, a broadcast-program viewing system is provided, which is comprised of the following elements (a) to (e).

(a) An information storage subsystem for storing original broadcast programs transmitted by a broadcasting station onto an information storage medium. The information storage subsystem is capable of random access to the information storage medium. Each of the original broadcast programs contains items having attribute information.

(b) An attribute information receiver for acquiring the attribute information for the items of the original broadcast programs.

(c) An input subsystem for allowing a viewer to input viewer's information according to the viewer's taste or desire.

(d) A controller for controlling the information storage subsystem and the attribute information receiver in such a way that the attribute information for the items of the received original broadcast programs and the inputted viewer's information are compared to designate at least one desired item in the items of the received original broadcast programs having a desired relationship with the inputted viewer's information.

(e) An output subsystem for reproducing the designated at least one desired item in the items of the received original broadcast programs according to the inputted viewer's information as a viewer's program.

With the broadcast-program viewing system according to the second aspect of the present invention, the attribute information for the items of the received original broadcast programs is acquired by the attribute information receiver and stored onto the random-accessible information storage medium by the use of the information storage subsystem. Then, under the control of the controller, the attribute information for the items is compared with the inputted viewer's information to designate the at least one desired item in the items of the received original broadcast programs having the desired relationship with the inputted viewer's information. The at least one desired item designated in the items of the received original broadcast programs are reproduced by the output subsystem according to the inputted viewer's information as the viewer's program.

As a result, the viewer is able to view the broadcast programs transmitted by the broadcasting station from a different angle. In other words, because the viewer's program is readily varied by changing the viewer's information, the viewer is able to optionally view the broadcast programs transmitted by the broadcasting station according to his taste or desire.

In a preferred embodiment of the system according to the second aspect of the present invention, the items of the received original broadcast programs are selected and/or rearranged along a time axis according to the inputted viewer's information.

In another preferred embodiment of the system according to the second aspect of the present invention, the attribute information receiver acquires the attribute information for the items of the received original broadcast programs through a different path from a broadcasting wave conveying the original broadcast programs.

In this case, the attribute information may be acquired through a communication line such as the INTERNET using a communication receiver such as a modem.

In a still another preferred embodiment of the system according to the second aspect of the present invention, the attribute information receiver acquires the attribute information for the items of the received original broadcast programs through a broadcasting wave conveying the original broadcast programs.

In this case, the attribute information is preferably transmitted from the broadcasting station transmitting the original programs and then, received along with the original broadcast programs. However, the attribute information may be transmitted from a different broadcasting station from the broadcasting station transmitting the original programs.

In a further preferred embodiment of the system according to the second aspect of the present invention, the controller controls the information storage subsystem and the attribute information receiver in such a way that the viewer's program is (i) a digest of at least one of the original broadcast programs transmitted by the broadcasting station, (ii) a program obtained by reediting at least two ones of the original broadcast programs transmitted by the broadcasting station, or (iii) a program obtained by rearranging the items of at least one of the original broadcast programs transmitted by the broadcasting station along a timing axis.

In the broadcast-program viewing method and system according to the first and second aspects of the present invention, the words "broadcast program", "item", "attribute information", and "viewer's information", has the following meanings.

The "broadcast program" means a broadcast program such as a TV program transmitted from a broadcasting station with or without wire. For example, any program such as "Seven O'clock News" and "Young's and Old's Songs" provided by the terrestrial or satellite broadcasting system or the cable television (CATV) system, e.g., the Nihon Hoso Kyokai (NHK), Sky PerfecTV!®, or the like.

The "broadcast program" consists of elements or constituents that are sequentially arranged along the time axis.

In other words, the "broadcast program" is the combination of the sequentially-arranged elements or constituents. Each of the elements or constituents of the "broadcast program" is optionally defined or partitioned by the "start time" or "start frame" and the "end time" or "end frame". Each of the elements or constituents typically contains at least one scene.

The "item" is equal to any one of the elements or constituents of the "broadcast program". Therefore, similar to the elements or constituents of the "broadcast program", the "item" is optionally defined or partitioned by the "start time" or "startframe" and the "endtime" or "endframe" in the "broadcast program" concerned.

For example, it is supposed that the TV program termed the "Seven O'clock News" is designed to be started at the time 7:00:00 (i.e., just seven o'clock) and ended at the time 8:00:00 (i.e., just eight o'clock) and ended at the time. In this case, if the "weather forecast" is designed to be broadcasted from the start time 7:40:00 (i.e., 40 minutes past seven) to the end time 7:41:30 (i.e., 41 minutes and 30 seconds past seven) in the "Seven O'clock News", the "weather forecast" is an element or constituent of the "Seven O'clock News". It can be said that the "weather forecast" is an "item" of the "Seven O'clock News".

A part of the "weather forecast" (for example, only one scene displaying a single weather map in the "weather forecast") may be defined as an "item" of the "Seven O'clock News". This is realized by changing the above-described start and end times.

The "attribute information" means the information representing the content of the "item", which is defined to be able to be compared with the inputted or specified "viewer's information" for the purpose of designating the at least one desired item.

Typically, the "attribute information" contains at least one "topic" or "subject" about the content of the "item", which serves as a keyword at the comparison with the "viewer's information". The "attribute information" may contain some additional data indicating the "class" of the content of the "item", such as the headline, show business, professional baseball, weather, and greetings. The "topic" or "subject" may be simply represented by the use of a character string. The additional data also may be represented by the use of a character string.

The "viewer's information" means the information representing the taste or desire of the viewer. In other words, the "viewer's information" means the information specifying the "item or items" of the "broadcast program or programs" that the viewer wants or does not want to view.

The "viewer's information" may simply contain any keyword and/or code. In this case, to compare the "viewer's information" with the "attribute information", the keyword and/or code of the "viewer's information" is compared with the "topic" or "subject" or "class" of the "attribute information".

BRIEF DESCRIPTION OF THE DRAWINGS

In order that the present invention may be readily carried into effect, it will now be described with reference to the accompanying drawings.

FIG. 9 is a schematic illustration showing the program map or list for the viewer's program shown in FIG. 6.

FIG. 10 is a schematic illustration showing the program map or list for the viewer's program shown in FIG. 7.

FIG. 11 is a schematic illustration showing the program map or list for the viewer's program shown in FIG. 8.

DETAILED DESCRIPTION OF THE PREFERRED EMBODIMENTS

Figure 1:
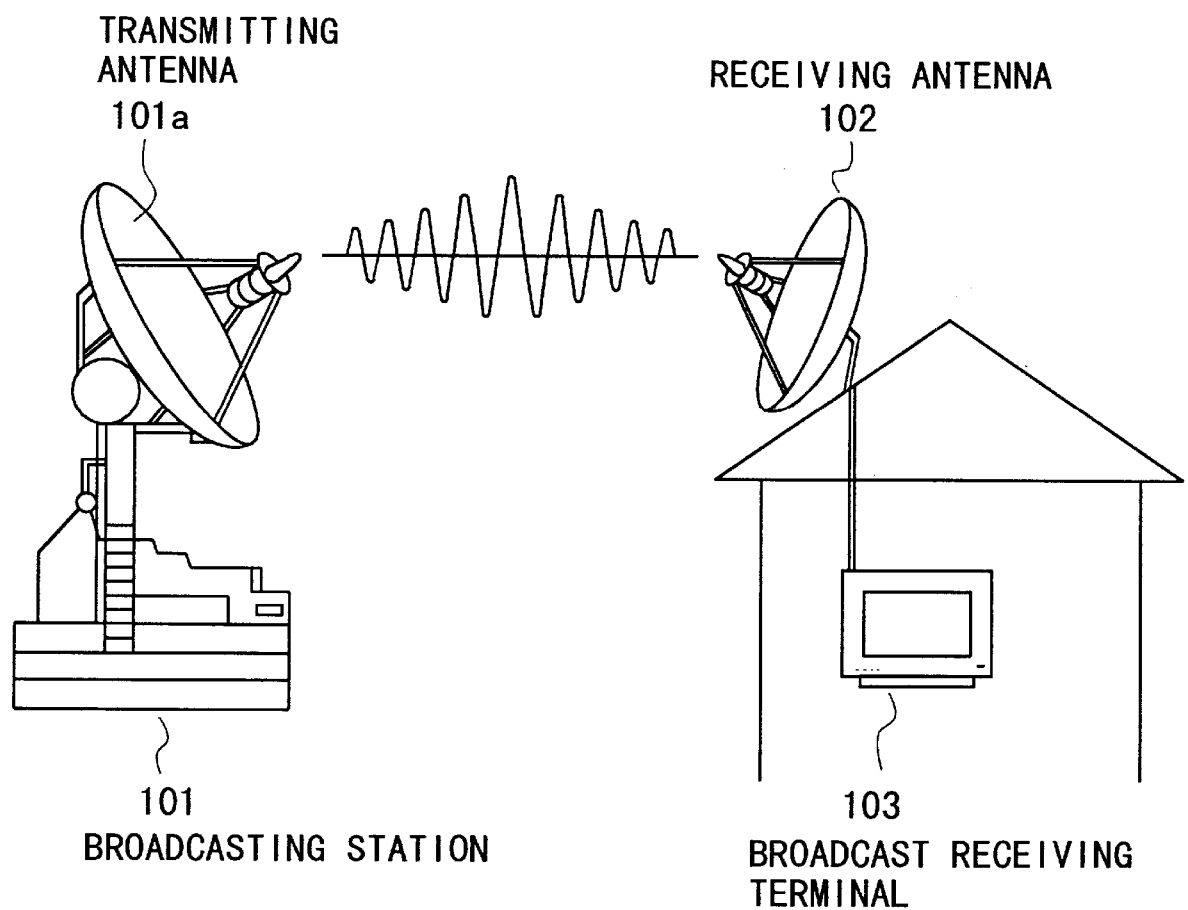
FIG. 1 is a schematic illustration showing a receiving method of broadcast programs transmitted from a broadcasting station.
Figure 2A:
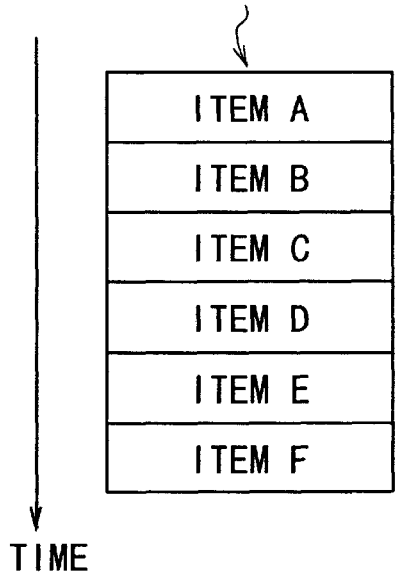
FIGS. 2A and 2B are schematic illustrations showing the configuration of an original TV program transmitted from the broadcasting station and that of a viewer's TV program viewed by the viewer, respectively.
Figure 2B:
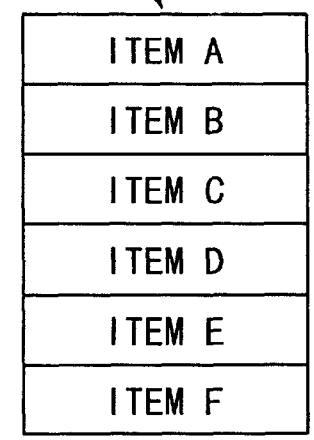

Preferred embodiments of the present invention will be described bellow while referring to the drawings attached.

FIRST EMBODIMENT

Figure 3:
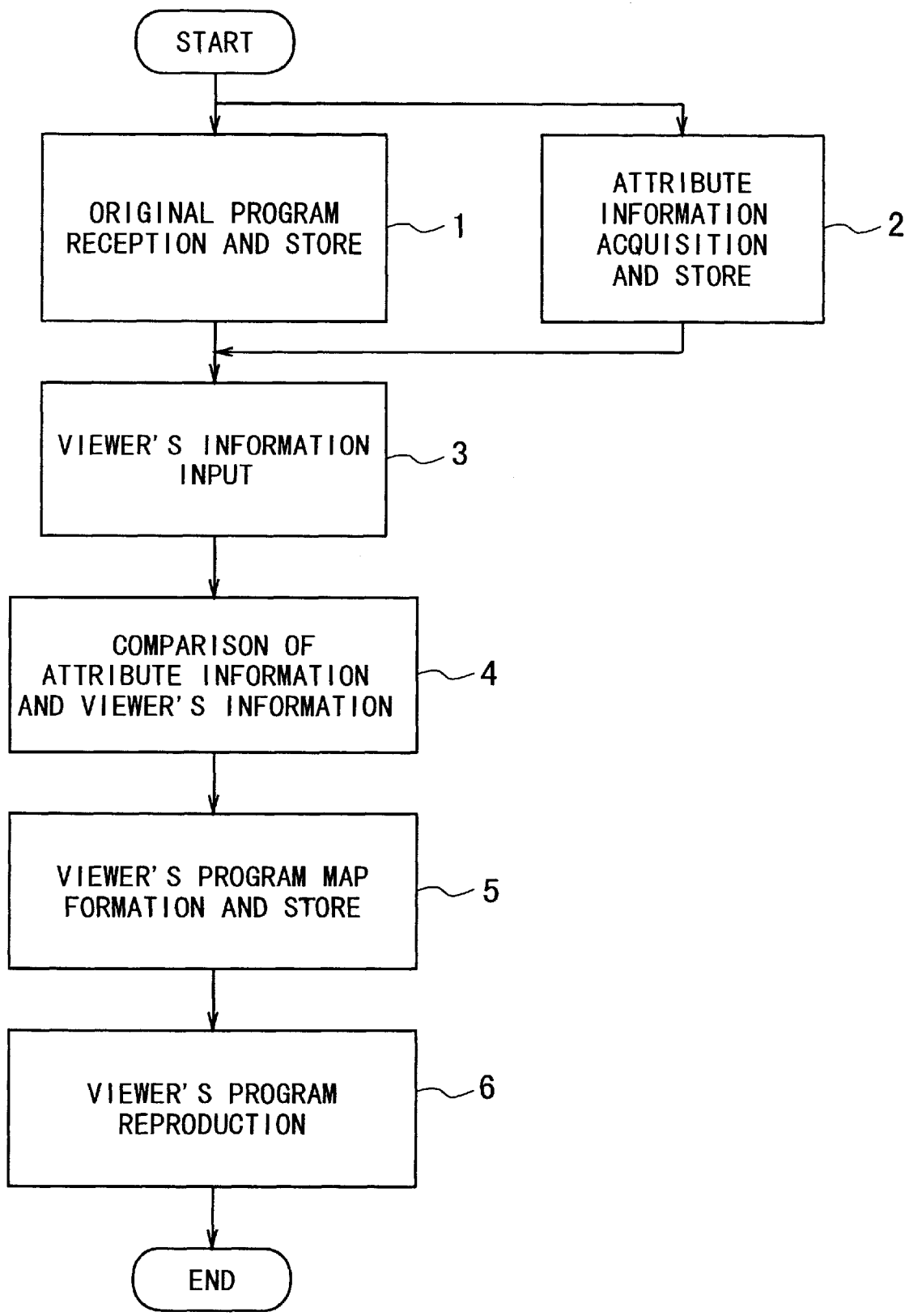
FIG. 3 is a flowchart showing the steps of a broadcast-program viewing method according to a first embodiment of the present invention.
Figure 5:
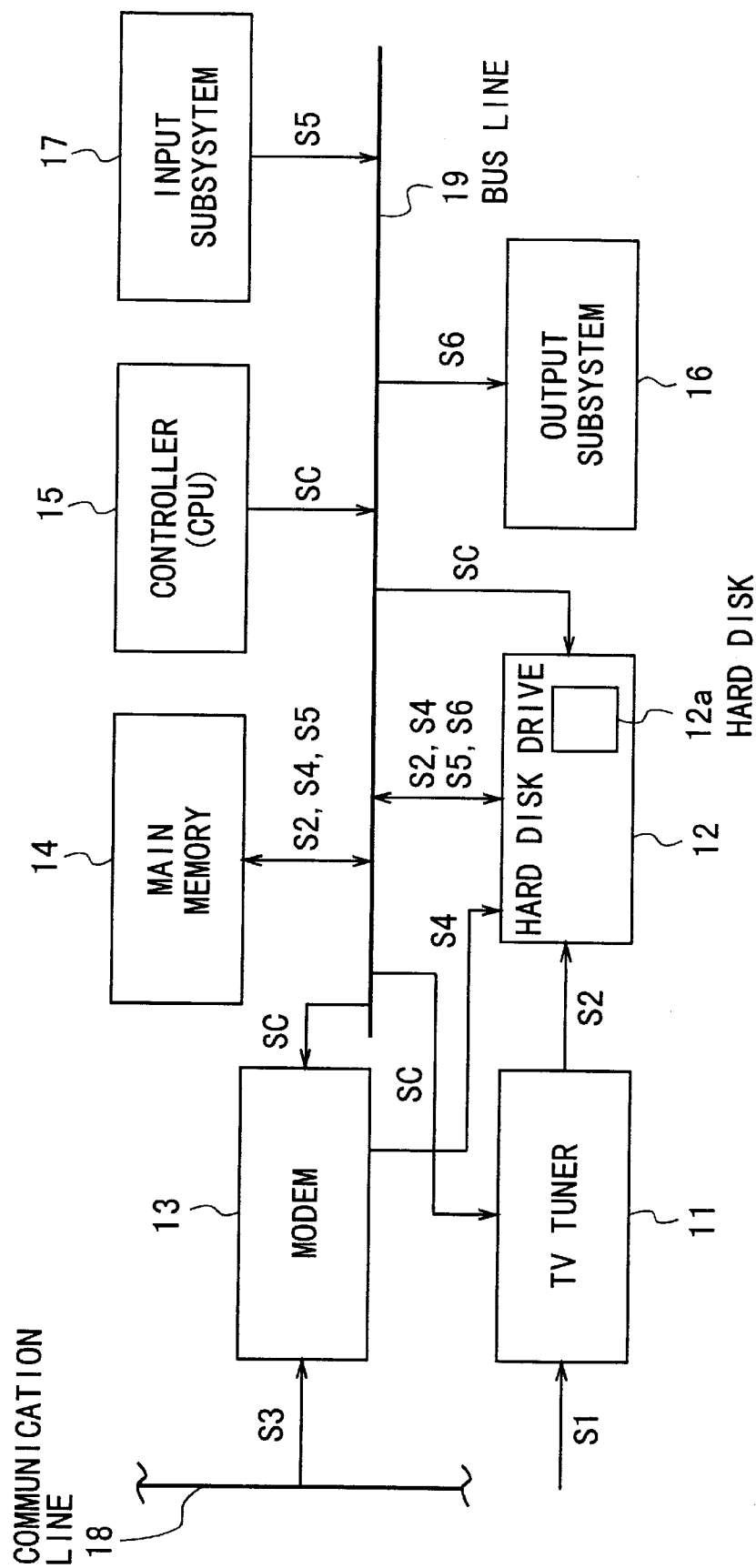
FIG. 5 is a block diagram showing the configuration of a broadcast-program viewing system according to the first embodiment of the present invention.

A broadcast-program viewing method according to a first embodiment of the present invention is carried out according to an algorithm shown in FIG. 3 by the use of a broadcast-program viewing system shown in FIG. 5.

As seen from FIG. 5, the broadcast-program viewing system according to the first embodiment of present invention is comprised of a TV tuner 11, a hard disk drive 12, a modem 13, a main memory 14, a controller or Central Processing Unit (CPU) 15, an output subsystem 16 (i.e., a color display and speakers), and an input subsystem 17 (i.e., a keyboard and a mouse or a control pad)

A digital-modulated radio wave transmitted from a broadcasting station (not shown) and conveying various original TV programs is received by an antenna (not shown), thereby outputting a radio signal S1.

The TV tuner 11 receives the radio signal S1 and selects a desired channel of a viewer to output a program signal S2 to the hard disk unit 12.

The hard disk drive 12 stores the original TV programs of the desired channel that have been transmitted by the program signal S2 onto a hard disk 12a. The hard disk drive 12 is capable of random access to the disk 12a, i.e., the stored information.

The modem 13 receives a communication signal S3 through a communication line 18 such as the INTERNET.

The communication signal S3 contains the attribute information of the original TV programs of the desired channel that have been transmitted from the broadcasting station. The attribute information of the original TV programs is readily prepared by automatically extracting the predesigned keywords and/or codes from the original TV programs at the broadcast station itself or any other organization.

Subsequently, the modem 13 sends the acquired attribute information of the original TV programs to the hard disk drive 12 as an attribute information signal S4. The attribute information is then stored onto the hard disk 12a in the hard disk drive 12.

The attribute information contains at least one "topic" or "subject" about the content of the item, which serves as a keyword at the comparison with the viewer's information. The attribute information further contains an additional data indicating the "class" of the content of the "item", such as the headline, show business, professional baseball, weather, and greetings. The "topic" or "subject" and "class" are simply represented by the use of a character string or strings.

The input subsystem 17 is used to input the viewer's information according to the viewer's taste or desire into this broadcast-program viewing system. The input system 17 sends a viewer's information signal S5 according to the viewer's information thus inputted to the hard disk drive 12 through a bus line 19. The inputted viewer's information is then stored in the hard disk 12a of the drive 12.

The controller or CPU 15 sends control signals SC to the TV tuner 11, the hard disk unit 12, and the modem 13, thereby controlling the whole operation of this broadcast-program viewing system. Under the control of the CPU 15, a viewer's program signal S5 reproducing a viewer's TV program according to the viewer's taste or desire is generated as an output signal of this broadcast-program viewing system by the use of the program signal S2, the attribute information signal S4, and the viewer's information signal S5. The viewer's program signal S5 is then sent to the output subsystem 16.

The output subsystem 16 is used to reproduce the viewer's TV program produced in this broadcast-program viewing system. The output subsystem 16 typically contains a color monitor (not shown) and speakers (not shown). The reproduced pictures of the viewer's TV program are displayed on a screen of the color monitor and the reproduced sounds of the viewer's TV program are emitted by the speakers.

Next, the broadcast-program viewing method according to the first embodiment of the present invention is explained below with reference to FIG. 3.

In the step 1, the original TV programs transmitted by the broadcasting station are received by the antenna, and the desired channel or channels of the viewer is/are selected by the TV tuner 11. The selected original TV programs are stored onto the hard disk 12a in the hard disk drive 12.

If the original TV programs are transmitted by an analog-modulated radio wave, the original TV programs are converted to digital data by a use of a suitable encoder (not shown) prior to the storage onto the hard disk 12a.

Each of the received original broadcast programs contains at least one item having attribute information. Therefore, the attribute information for the item or items of the received original TV programs is acquired by the modem 13 through the communication line 18 and then, the acquired attribute information is stored onto the hard disk 12a in the hard disk drive 12 in the step 2. The attribute information may be acquired during, before, or after the broadcasting or receiving time of the original TV programs.

Thereafter, in the step 3, the viewer's information according to the viewer's taste or desire is inputted by the viewer into this broadcast-program viewing system using the input subsystem 17.

In the step 4, the stored attribute information for the items of the received original TV programs and the inputted viewer's information are compared under the control of the CPU 15. Specifically, the attribute information for the items of the received original TV programs and the viewer's information are read out from the hard disk 12a to thereby find the desired items of the received original TV programs that satisfy the viewer's information.

Using the desired items of the received original TV programs thus found, a viewer's program map or list is formed and stored onto the hard disk 12a in the step 5.

Simply, the viewer's information consists of at least one keyword or character string that specifies the desired items of the original TV programs. Usually, the viewer's information further consists of an additional data specifying the reproduction order or time arrangement of the desired items. On the other hand, the attribute information contains at least one "topic" or "subject" and "class" data about the content of the item. Therefore, the viewer's program map or list includes the items of the original TV programs relating to the viewer's information, the comparison result, and the reproduction order of the desired items.

Finally, in the step 6, the desired items of the received original TV programs are reproduced by the output subsystem 16 according to the reproduction order in the program map formed in the step 5 as a viewer's program.

Figure 4:
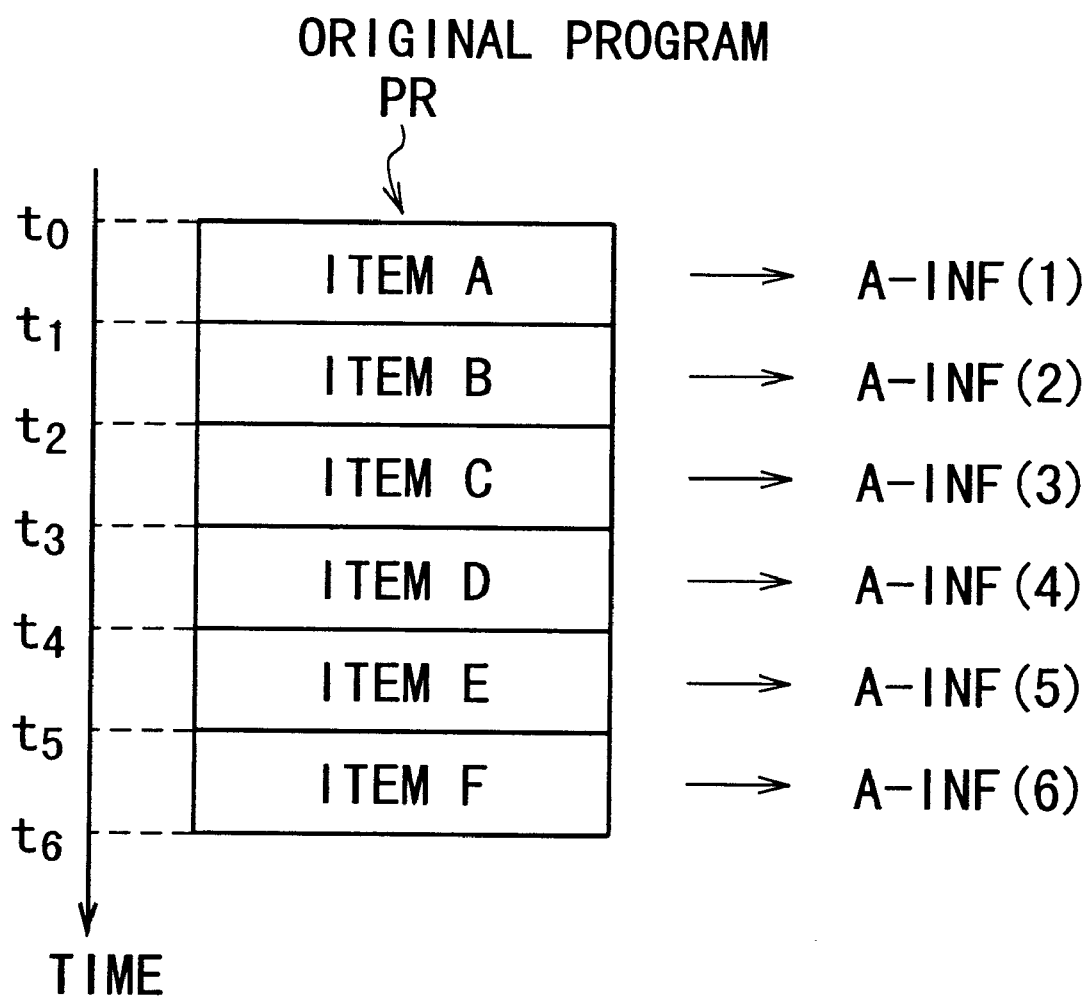
FIG. 4 is a schematic illustration showing the configuration of an original TV program transmitted from a broadcasting station, in which the relationship between the timing arrangement of the items of the program and their attribute information are also shown.

FIG. 4 shows a configuration example of one of the received original TV programs, in which this original program PR contains six items A, B, C, D, E, and F arranged along a time axis.

As seen from FIG. 4, the first item A, which starts at the time to and ends at the time $t_1$, has attribute information A-INF(1). The second item B, which starts at the time $t_1$ and ends at a time $t_1$, has attribute information A-INF(2). The third item C, which starts at the time $t_2$ and ends at the time $t_3$, has attribute information A-INF(3). The fourth item D, which starts at the time $t_3$ and ends at the time $t_4$, has attribute information A-INF(4). The fifth item E, which starts at the time $t_4$ and ends at the time $t_5$, has attribute information A-INF(5). The sixth item F, which starts at the time $t_5$ and ends at the time $t_6$, has attribute information A-INF(6).

Figure 6:
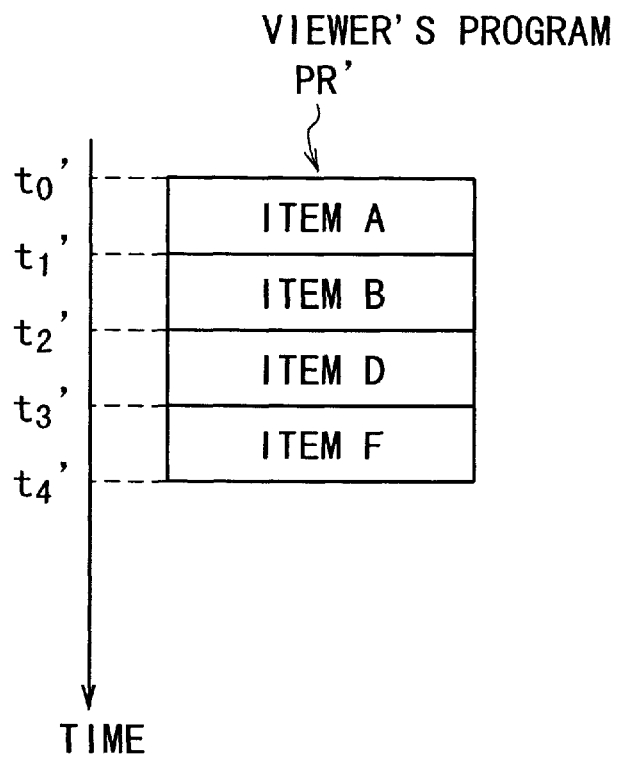
FIG. 6 is a schematic illustration showing the configuration of a viewer's program viewed by the viewer, in which the items of the original TV program are selected.

FIG. 6 shows a configuration of the viewer's program PR', in which the viewer's program PR' contains the four items A, B, D, and F of the original TV program PR shown in FIG. 4 while the reproduction order of these items A, B, D, and F is unchanged. In this case, the viewer's program PR' is obtained as a digest of the original TV program PR of FIG. 4.

The viewer's program map or list for the viewer's program PR' of FIG. 6 is shown in FIG. 9. As shown in FIG. 9, each of the six items A, B, C, D, E, and F of the original TV program PR are compared with the inputted viewer's information V-INF and then, the comparison result for these items is listed in the program map along with their reproducing time. According to this map, the viewer's program is produced from the original TV program PR and played back at the output subsystem 16.

The viewer's program PR' of FIG. 6 is effective for the case where the viewer wants to view only the news items relating to a desired foreign country.

Figure 7:
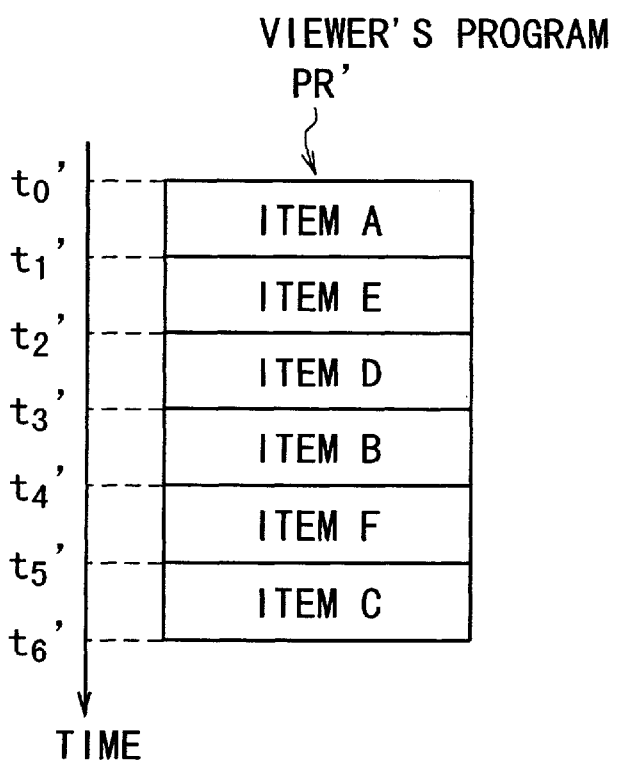
FIG. 7 is a schematic illustration showing the configuration of a viewer's program viewed by the viewer, in which the time order of the same items of the original TV program are rearranged.

FIG. 7 shows another configuration of the viewer's program PR', in which the viewer's program PR' contains the six items A, B, C, D, E, and F of the original TV program PR shown in FIG. 4 while the reproduction order of these items A, B, C, D, E, and F is changed. In this case, the viewer's program PR' is obtained as an item rearrangement of the original TV program PR of FIG. 4.

The viewer's program map or list for the viewer's program PR' of FIG. 7 is shown in FIG. 10. As shown in FIG. 10, each of the six items A, B, C, D, E, and F of the original TV program PR are compared with the inputted viewer's information V-INF and then, the comparison result for these items is listed in the program map along with their reproducing time. According to this map, the viewer's program is produced from the original TV program PR and played back at the output subsystem 16.

The viewer's program PR' of FIG. 7 is effective for the case where the viewer wants to view the news items of the news program according to his desired time order arranged dependent on the level of pleasure or enjoyment.

Figure 8:
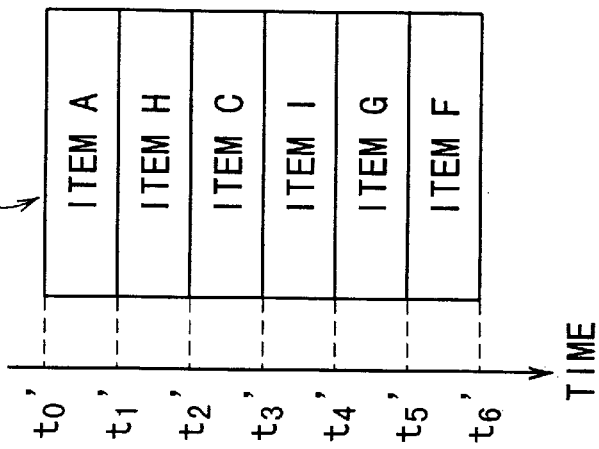
FIGS. 8A and 8B are schematic illustrations showing the configuration of two original TV programs transmitted from the broadcasting station and that of a viewer's program viewed by the viewer, respectively, in which the items of the two original TV programs are selected and mixed in the viewer's program.

FIG. 8B shows still another configuration of the viewer's program PR', in which the viewer's program PR' contains the six items A, H, C, I, G, and F of the two original TV programs PR1 and PR2 shown in FIG. 8A while the reproduction order of the items A, B, C, D, E, and F of the program PR1 and the items G, H, I, and J of the program PR2 is changed. In this case, the viewer's program PR' is obtained as an item selection and combination (or, cut and rearrangement) of the original TV programs PR1 and PR2 of FIG. 8A.

The viewer's program map or list for the viewer's program PR' of FIG. 8B is shown in FIG. 11. As shown in FIG. 11, each of the ten items A, B, C, D, E, F, G, H, I, and J of the two original TV programs PR1 and PR2 are compared with the inputted viewer's information V-INF and then, the comparison result for these items is listed in the program map along with their reproducing time. According to this map, the viewer's program PR' is produced from the original TV programs PR1 and PR2 and played back at the output subsystem 16.

The viewer's program PR' of FIG. 8B is effective for the case where the viewer wants to view only the desired news items (e.g., sport news) of the two news programs according to his desired time order.

Besides, the attribute information is comprised of at least one "row" describing the "start time", the "end time", and the "content" of the item. Therefore, it is supposed that the original TV program PR is a "Seven O'clock News" having the following attribute information.

| Start time, | End time,  | Content                                       |
|-------------|------------|-----------------------------------------------|
| 07:00:00,   | 07:05:00,  | headlines X, Y, Z,                            |
| 07:05:00,   | 07:06:00,  | T. Kimura/ show business,                     |
| 07:06:00,   | 07:07:30,  | S. Nagashima/ baseball/sport/ home run,       |
| 07:07:30,   | 07:10:20,  | weather forecast,                             |
| 07:10:20,   | 07:11:00,  | end greeting,                                 |

If the "Seven O'clock News" having the above-described attribute information is used as the original TV program PR, at least one word or character string listed in the "content" of the item is used as the viewer's information. For example, to specify the second item that starts at 07:05:00 and ends at 07:06:00, at least one of the character strings "T. Kimura" and "show business" is specified by the viewer. To specify the fourth item that starts at 07:07:30 and ends at 07:10:20, it is sufficient that a single character string "weather forecast" is specified by the viewer.

The controller 15 controls to carry out a keyword retrieval or full-text retrieval to find the character string or strings thus specified to find the items including the specified string or strings, thereby forming the viewer's program map or list.

Next, an example of the notation of the attribute information of the program item is explained below.

The program item can be expressed by the use of the following notation as

[attribute information]:=[row] [attribute-information ending mark]

In this notation, the content of [row] is expressed by the combination of the start time and the end time of the item, the content information of the item, and the row-partitioning mark as

[row]:=[start time] [end time] [content information] [row partitioning mark]

[start time]:=[year] [month] [day] [hour] [minute] [second] [millisecond]

[end time]:=[year] [month] [day] [hour] [minute] [second] [millisecond]

[content information]:=(any character(s) and mark(s) except for the row-partitioning mark)

The values of [year], [month], [day], [hour], [minute], [second], and [millisecond] have 4 figures, 2 figures, 2 figures, 2 figures, 2 figures, 2 figures, and 3 figures, respectively. These values are right-aligned in each pair of these brackets and a value of "0" is inserted into each unfilled figure.

As the [row-partitioning mark], a popular carriage-return mark "CR" or any other character or mark may be used.

As the [attribute-information ending mark], any character or mark may be used according to the applied operating system (OS).

With the broadcast-program viewing method according to the first embodiment of the present invention, each of the received original TV programs PR contains the items having the attribute information, and the attribute information for the items is acquired and stored onto the hard disk 12a in the hard disk drive 12.

Then, the attribute information for the items of the received original TV programs PR is compared with the specified viewer's information V-INF, thereby designating at least one desired item in the items of the received original TV programs PR having the desired relationship with the specified viewer's information V-INF. Subsequently, the at least one desired item designated in the items of the received original TV programs PR is reproduced according to the specified viewer's information V-INF as the viewer's program PR'.

As a result, the viewer is able to view the original TV programs PR transmitted by the broadcasting station from a different angle. In other words, because the viewer's program PR' is readily varied by changing the viewer's information V-INF, the viewer is able to optionally view the original TV programs PR transmitted by the broadcasting station according to his taste or desire.

SECOND EMBODIMENT

Figure 12:
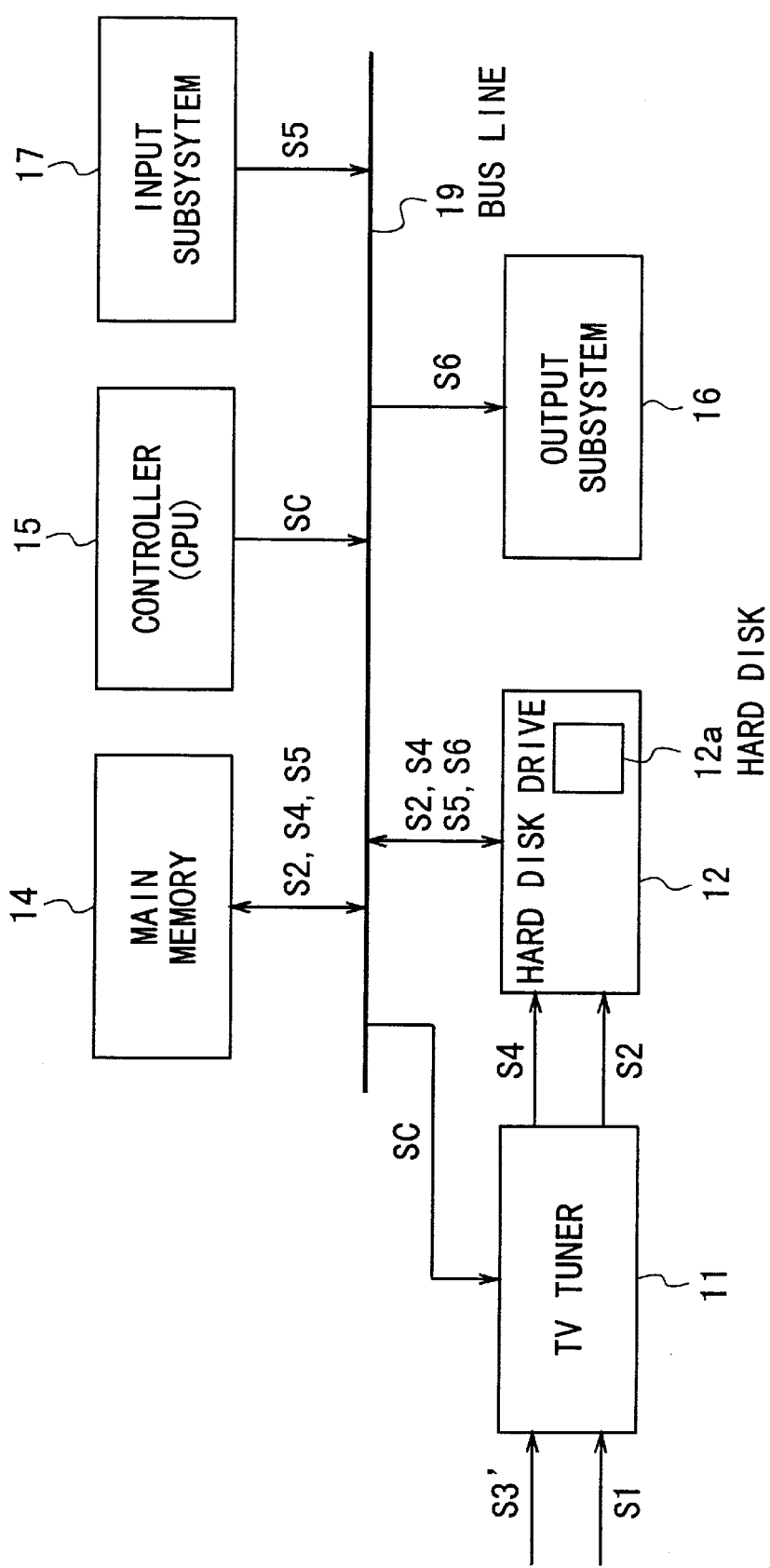
FIG. 12 is a block diagram showing the configuration of a broadcast-program viewing system according to a second embodiment of the present invention.

FIG. 12 shows a broadcast-program viewing system according to a second embodiment of the present invention.

This viewing system has the same configuration as that of the broadcast-program viewing system according to the first embodiment shown in FIG. 5 except that the modem 13 is omitted and the attribute information is acquired by the TV tuner 11. The attribute information is transmitted as a signal S3' through a radio wave.

Therefore, explanation about the same configuration as that of the first embodiment is omitted here by attaching the same reference numerals to the same elements in FIG. 12 for the sake of simplification of description.

The same viewing method as that of the first embodiment is carried out in this system of FIG. 12. Therefore, it is obvious that the broadcast-program viewing system according to the second embodiment has the same advantages as those in the first embodiment. There is an additional advantage that the modem 13 can be omitted and therefore, the fabrication cost of the system is decreased.

While the preferred embodiments of the present invention have been described, it is to be understood that modifications will be apparent to those skilled in the art without departing from the spirit of the invention. The scope of the invention, therefore, is to be determined solely by the following claims.

What is claimed is:

1. A method of viewing broadcast programs transmitted by a broadcasting station, the programs being comprised of a plurality of separate program items broadcast in a time sequence, the method comprising:

storing the broadcast programs in a random access information storage medium;

receiving transmitted attribute information characterizing the respective program items and storing the received attribute information in the information storage medium;

generating and storing a body of viewer preference information;

comparing the program item attribute information and the stored viewer preference information to identify one or more program items having a desired relationship with the viewer preference information; and reproducing the individual identified program items for viewing from the information storage medium wherein the time sequence of the program items is rearranged according to viewer preference information.

2. A method of viewing broadcast programs transmitted by a broadcasting station, the programs being comprised of a plurality of separate program items, the method comprising:

storing the broadcast programs in a random access information storage medium;

receiving transmitted attribute information characterizing the respective program items and storing the received attribute information in the information storage medium;

generating and storing a body of viewer preference information;

comparing the program item attribute information and the stored viewer preference information to identify one or more program items having a desired relationship with the viewer preference information; and reproducing the individual identified program items for viewing from the information storage medium, wherein the program attribute information is transmitted from a different broadcasting station from the broadcasting station transmitting the broadcast programs.

3. A system for viewing broadcast programs, the programs being comprised of separate program items broadcast in a time sequence, the viewing system comprising:

an information storage subsystem including a random access storage medium a first information processing sub-system which is operative to store broadcast programs transmitted by a broadcasting station in the random access storage medium;

a program attribute sub-system which is operative to store transmitted attribute information concerning the respective program items;

an input subsystem which allows a viewer to input preference information;

a controller for controlling the information storage subsystem and the program attribute sub-system to compare the program item attribute information and the inputted viewer preference information and to identify one or more program item having a desired relationship with the inputted viewer preference information; and an output sub-system which reproduces the individual identified program items for viewing from the random access storage medium, wherein the controller is operative to rearrange the time sequence of the program items according to the viewer preference information.

4. A system for viewing broadcast programs, the programs being comprised of separate program items, the viewing system comprising:

an information storage subsystem including a random access storage medium a first information processing sub-system which is operative to store broadcast programs transmitted by a broadcasting station in the random access storage medium;

a program attribute sub-system which is operative to store transmitted attribute information concerning the respective program items;

an input subsystem which allows a viewer to input preference information;

a controller for controlling the information storage subsystem and the program attribute sub-system to compare the program item attribute information and the inputted viewer preference information and to identify one or more program item having a desired relationship with the inputted viewer preference information; and an output sub-system which reproduces the individual identified program items for viewing from the random access storage medium, wherein the program attribute sub-system receives the program item information from a different broadcasting station from the broadcasting station transmitting the broadcast programs.

5. A method of editing information programs transmitted by broadcasters comprising:

receiving transmitted programs, each program being comprised of a series of separate program items which collectively constitute a coherent program presentable as transmitted without editing storing the transmitted programs in a random access information storage medium;

receiving transmitted attribute information characterizing the respective program items storing the transmitted attribute information in the information storage medium;

generating and storing a body of viewer preference information;

comparing the program item attribute information and the stored viewer preference information to identify one or more program items having a desired relationship with the viewer preference information; and reproducing the individual identified program items for viewing from the information storage medium.

6. The method as claimed in claim 5, wherein the attribute information is transmitted by different paths from the transmitted programs.

7. The method as claimed in claim 6, wherein the program attribute information is received on demand over a communication network connected to a communication receiver.

8. The method as claimed in claim 5, wherein the program attribute information is received from the broadcasting waves conveying the transmitted programs.

9. The method as claimed in claim 8, wherein attribute information is received from the broadcasters along with the transmitted programs.

10. The method as claimed in claim 5, further including reproducing for presentation a digest of at least one transmitted program.

11. The method as claimed in claim 5, further including:

editing at least two separate transmitted programs; and reproducing at least one program item from each of the edited programs for presentation.

12. The method as claimed in claim 5, wherein the program items are transmitted in a time sequence, and further including:

rearranging the time sequence of the programs items of at least one of the transmitted programs; and reproducing the program items for presentation in the rearranged time sequence.

13. A system for editing information programs transmitted by broadcasters, the system comprising:

a receiver for transmitted programs, each program being comprised of series of separate program items which collectively constitute a coherent program presentable as transmitted without editing;

an information storage subsystem including a random access storage medium coupled to the receiver;

a first information processing sub-system which is operative to store the transmitted program in the random access storage medium;

a program attribute sub-system which is operative to receive transmitted attribute information concerning the respective program items;

an input subsystem which allows a user to input preference information;

a controller for controlling the information storage subsystem and the program attribute sub-system to compare the program item attribute information and the inputted user preference information and to identify up to all of the program items as having a desired relationship with the inputted preference information; and an output sub-system which reproduces the identified program items for presentation from the random access storage medium.

14. The system as claimed in claim 13, wherein the program attribute sub-system is operative to receive the attribute information over a different path from the corresponding transmitted program.

15. The system as claimed in claim 14, wherein the program attribute sub-system is operative to receive the program attribute information on demand over a communication network.

16. The system as claimed in claim 13, wherein the program attribute sub-system is operative to receive the program item attribute information by processing the broadcasting waves conveying the transmitted programs.

17. The system as claimed in claim 16, wherein the program attribute sub-system receives the program item attribute information from a broadcaster along with a transmitted program.

18. The system as claimed in claim 13, wherein the output sub-system is operative to reproduce for presentation a digest of at least one transmitted program.

19. The system as claimed in claim 13, wherein the controller is operative to control the information storage subsystem and the program attribute sub-system to compare the inputted user preference information with program item attribute information for at least two separate transmitted programs and to identify up to all of the program items as having a desired relationship with the inputted preference information.

20. The system as claimed in claim 13, wherein the program items are transmitted in a time sequence, and wherein the controller is operative to rearrange the time sequence of the program items of at least one transmitted program; and the output subsystem is operative to reproduce the program items for presentation in the rearranged time sequence.

* * * * *